(12) United States Patent
Thind et al.

(10) Patent No.: US 8,103,823 B2
(45) Date of Patent: Jan. 24, 2012

(54) HOST INITIATED BACKGROUND FORMATTING OF OPTICAL MEDIUM

(75) Inventors: Ravinder Singh Thind, Sammamish, WA (US); Martijn de Kort, Mill Creek, WA (US); Darren Glen Moss, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 657 days.

(21) Appl. No.: 12/192,109

(22) Filed: Aug. 14, 2008

(65) Prior Publication Data

US 2010/0039909 A1  Feb. 18, 2010

(51) Int. Cl.
*G06F 12/00* (2006.01)
(52) U.S. Cl. ........ 711/112; 711/151; 711/156; 711/158; 369/47.11; 369/47.13; 369/275.3
(58) Field of Classification Search ........ 711/112, 711/151, 156, 158; 369/47.11, 47.13, 275.3
See application file for complete search history.

(56) References Cited

U.S. PATENT DOCUMENTS

| | | | |
|---|---|---|---|
| 6,760,288 B2 | 7/2004 | Ijtsma et al. | |
| 6,996,666 B2* | 2/2006 | Sasaki | 711/112 |
| 7,133,339 B2* | 11/2006 | Sasaki | 369/53.17 |
| 7,187,640 B2 | 3/2007 | Heemskerk et al. | |
| 7,441,076 B2* | 10/2008 | Sasaki | 711/112 |
| 7,509,453 B2* | 3/2009 | Green et al. | 711/112 |
| 7,586,821 B2* | 9/2009 | Sasaki | 369/53.17 |
| 2004/0160875 A1 | 8/2004 | Sasaki | |
| 2007/0053267 A1 | 3/2007 | Brondijk | |
| 2007/0083702 A1* | 4/2007 | Sakai | 711/112 |
| 2008/0059689 A1 | 3/2008 | Sasaki | |
| 2008/0205213 A1* | 8/2008 | Miyamoto | 369/47.13 |
| 2009/0135707 A1* | 5/2009 | Namiki et al. | 369/275.3 |

FOREIGN PATENT DOCUMENTS

| | | |
|---|---|---|
| EP | 1879193 A1 | 1/2008 |
| EP | 1906403 A2 | 4/2008 |
| WO | 2007052574 A1 | 5/2007 |
| WO | 2007066263 A3 | 6/2007 |

OTHER PUBLICATIONS

"Mt. Rainier Format", retrieved at <<http://www.cdrinfo.com/Sections/Reviews/Specific.aspx?ArticleId=6091>>, Feb. 18, 2002, pp. 1-3.
"Data Interchange on 120 mm and 80 mm Optical Disk using +RW DL Format","ecma international", Dec. 2006, pp. 1-159.

* cited by examiner

*Primary Examiner* — Stephen Elmore
(74) *Attorney, Agent, or Firm* — Capitol City TechLaw; Richard C. Irving

(57) ABSTRACT

A method and a host processing device are provided for background formatting, or de-icing, an optical medium with no de-icing assistance from an optical drive upon which the optical medium is mounted. In a foreground mode, an optical medium may be initially formatted, volume structures may be recorded on the optical medium, file system information may be written thereto, and quick grow formatting may be performed to make the optical medium writable, at least sequentially. Under initiation and control of a file system, executing on a host processing device, the optical medium may be formatted, or de-iced, in a background mode with no assistance from an optical drive, upon which the optical medium is mounted. Under control of the file system, blocked input or output activity, may be allowed to access the optical medium upon pausing the formatting, or de-icing.

20 Claims, 5 Drawing Sheets

HOST INITIATED BACKGROUND FORMATTING OF OPTICAL MEDIUM

BACKGROUND

A first class of optical medium, such as, for example, CD-RW, DVD-RW, as well as others, is fully formatted (also known as "de-icing"), before random read and random write operations can be performed throughout the optical medium. As a result, a considerable amount of time is spent, during the formatting, before user data can be transferred onto the optical medium. Depending on a speed of an optical drive or an optical medium, the formatting may take anywhere from 20-50 minutes. During the 20-50 minutes of the formatting, the optical medium cannot be used by a user.

A second class of optical medium, such as, for example, CD-Mount Rainier ReWritable (CD-MRW) and DVD+RW, as well as others, is available for user access before an optical medium is completely formatted, or de-iced. The second class of optical medium is designed to be capable of supporting background formatting, or de-icing, while allowing random user access. An optical drive, itself, formats the optical medium of the second class in the background. Background formatting and random user access of the second class of optical media by the optical drive is possible because of information that is preserved on the optical medium. For example, a bitmap of all recorded error correction code (ECC) blocks, as well other information, may be preserved on the optical medium.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

In embodiments consistent with the subject matter of this disclosure, a file system executing on a host processing device may initiate and control background formatting of an optical medium mounted on an optical drive, without any assistance from the optical drive. In a foreground mode, the optical medium may be initially formatted to record volume structures on the optical medium and to record file system information in the volume structures. The file system may then perform quick grow formatting of the optical medium to make the optical medium accessible, at least sequentially, with respect to writing to the optical medium. A next write address (NWA) may indicate a next address, of the optical medium, to which data may be written. Addresses, of the optical medium, which are lower than the NWA may be read. When the file system detects that input or output activity, other than the background formatting, with respect to the optical medium, is blocked, the file system may pause a background formatting process to permit the input or output activity to occur, with respect to the optical medium. The file system may resume the background formatting after a predetermined time period of no input or output activity, with respect to the optical medium.

In various embodiments, when an optical medium is inserted into an optical drive, the file system may send one or more commands to the optical drive to determine whether the optical medium is blank, or non-blank, and if non-blank, whether the optical medium has been partially or completely background formatted (de-iced). If the file system determines that the optical medium is blank the file system may perform, in a foreground mode, initial formatting of the optical medium to write volume structures onto the optical medium and to write file system information to the volume structures. The file system may also perform in the foreground mode, quick grow formatting of the optical medium to make the optical medium capable of being written to, at least sequentially.

If the inserted optical medium is non-blank and partially background formatted, the file system may initiate and control a resumption of the background formatting of the optical medium. In some embodiments, the file system may wait for a request for an input or output operation, with respect to the optical medium, before initiating the background formatting of the optical medium.

DRAWINGS

In order to describe the manner in which the above-recited and other advantages and features can be obtained, a more particular description is described below and will be rendered by reference to specific embodiments thereof which are illustrated in the appended drawings. Understanding that these drawings depict only typical embodiments and are not therefore to be considered to be limiting of its scope, implementations will be described and explained with additional specificity and detail through the use of the accompanying drawings.

FIG. 1 illustrates a functional block diagram of an exemplary host processing device, which may be used to implement embodiments consistent with the subject matter of this disclosure.

FIG. 2 is a flowchart illustrating an exemplary process for performing a portion of a formatting process of an optical medium in a foreground mode and for performing de-icing, or background formatting, of the optical medium in a background mode under control of a file system of a host processing device with no background formatting assistance from an optical drive, upon which the optical medium is mounted.

DETAILED DESCRIPTION

Figure 1:
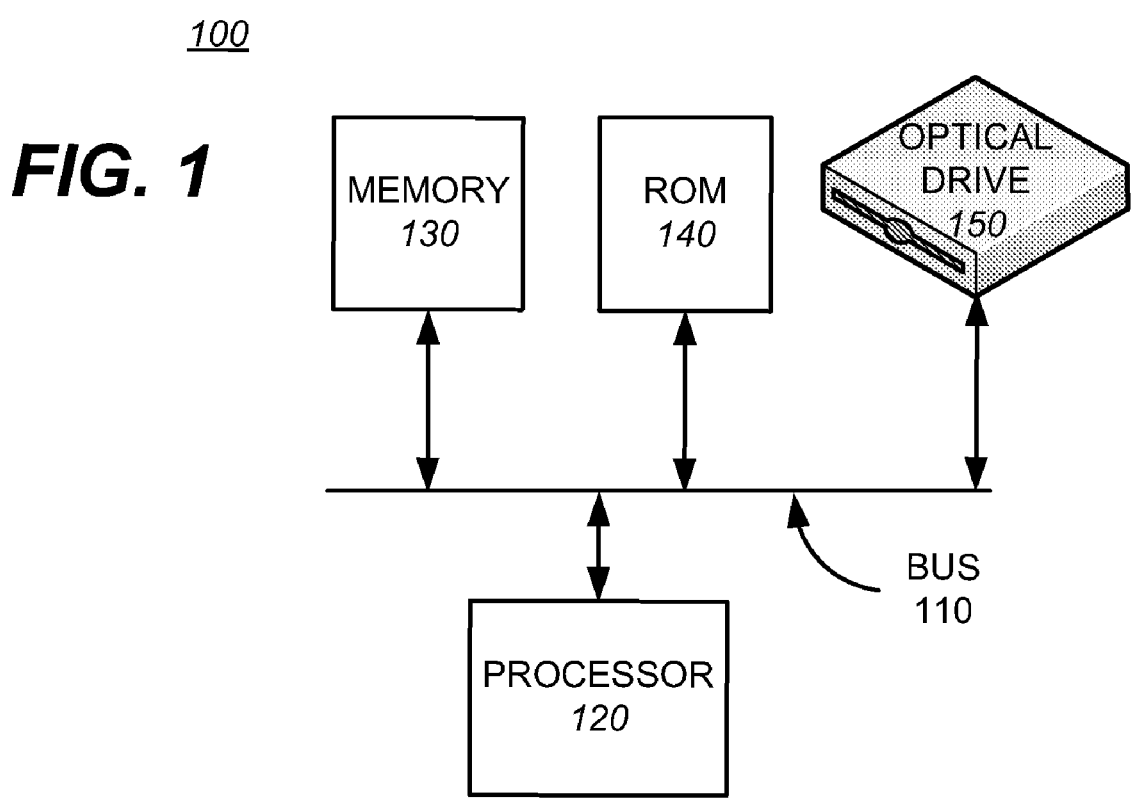

Embodiments are discussed in detail below. While specific implementations are discussed, it is to be understood that this is done for illustration purposes only. A person skilled in the relevant art will recognize that other components and configurations may be used without parting from the spirit and scope of the subject matter of this disclosure.

Overview

A method and a host processing device are provided, such that a file system executing on the host processing device may perform background formatting of an optical medium mounted on an optical drive.

In various embodiments consistent with the subject matter of this disclosure, a user may issue a format command from a host processing device, which either includes an internal optical drive, or is connected to an external optical drive. As a result of issuing the format command, a file system executing from a memory, or storage, of the host processing device, may send commands to the optical drive to perform an initial format of an optical medium mounted therein. The file system may further lay down volume structures on the optical medium and may record file system information in the volume structures. The file system may then issue one or more commands to cause the optical drive to perform a quick format of the optical medium. The quick formatting may be what is known as quick grow formatting. As a result of the quick grow formatting, the optical medium may only be written to sequentially, starting at a next writable address (NWA).

Up until this point, the formatting of the optical medium may be executed in a foreground. That is, no user input/output access to the optical medium may be allowed during the above-mentioned formatting. After completion of the formatting, discussed above, the file system may initiate and control a background formatting process (also known as de-icing) of the optical medium without any background format support from the optical drive.

During the background formatting process, a user may attempt to read from or write to the optical medium. As a result, the background formatting process may be paused and the user read or write, with respect to the optical medium, may be permitted. After a predetermined amount of no input/output activity, with respect to the optical medium, the file system may resume the background formatting process.

Under certain conditions the background formatting process may be stopped. The conditions may include, but not be limited to, the user ejecting the optical medium from the optical drive, the user dismounting a volume (the optical medium), and shutting down of the host processing device.

While the background formatting process is executing, the optical medium is in an open session state. When the optical medium is in the open session state, the optical medium is said to be ROM incompatible. Therefore, the optical medium may not be accessible on some optical drives. After the background formatting process is completed, the file system places the optical medium in a closed session state, such that the optical medium is then ROM compatible.

Exemplary Processing Device

FIG. 1 is a functional block diagram of an exemplary host processing device 100, which may be used to implement processing device embodiments consistent with the subject matter of this disclosure. Host processing device 100 may be a desktop personal computer (PC), a notebook or laptop PC, or other processing device. Host processing device 100 may include a bus 110, a memory 130, a read only memory (ROM) 140, a processor 120, and an optical drive 150. Bus 110 may permit communication among components of host processing device 100.

Processor 120 may include at least one conventional processor or microprocessor that interprets and executes instructions. Memory 130 may be a random access memory (RAM) or another type of dynamic storage device that stores information and instructions for execution by processor 120. Memory 130 may store temporary variables or other intermediate information used during execution of instructions by processor 120. ROM 140 may include a conventional ROM device or another type of static storage device that stores static information and instructions for processor 120. Optical drive 150 may be an internal optical drive or an external optical drive connected to host processing device 100 for mounting of an optical medium capable of storing data.

Host processing device 100 may perform functions in response to processor 120 executing sequences of instructions contained in a tangible machine-readable medium, such as, for example, memory 130, ROM 140, or other medium. Such instructions may be read into memory 130 from another machine-readable medium or from a separate device via a communication interface (not shown).

Exemplary Processing

Figure 2:
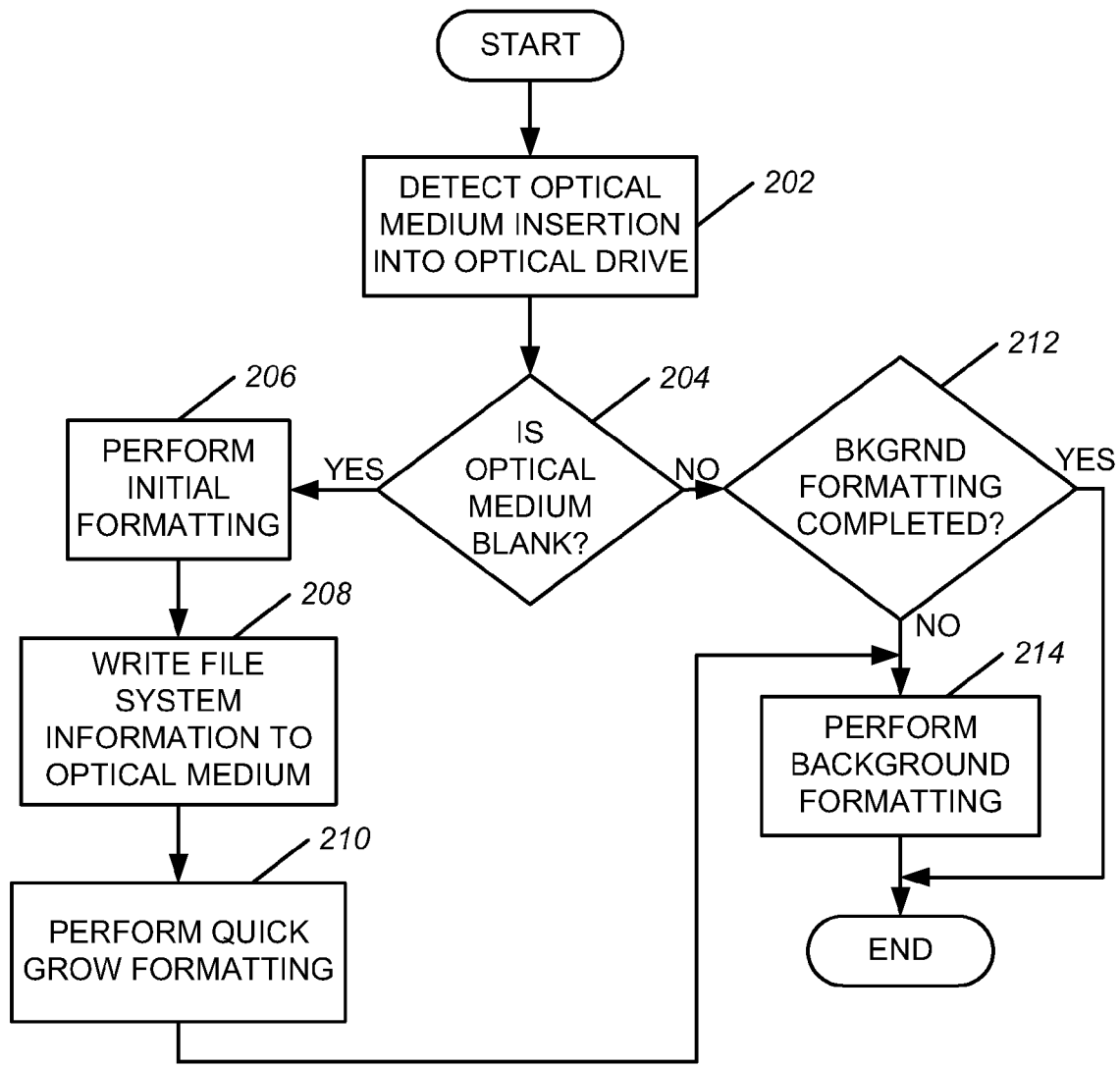

FIG. 2 is a flowchart illustrating exemplary processing in an embodiment consistent with the subject matter of this disclosure. A file system may be stored in storage, such as, for example, memory 130, ROM 140, or other storage device of host processing device 100. The process may begin with the file system, executing on host processing device 100, receiving an indication that an optical medium has been inserted into optical drive 150 (act 202). The file system may send one or more commands to optical drive 150 to determine whether the optical medium is blank (act 204).

If the optical medium is determined to be blank, then the file system may perform initial formatting of the optical medium (act 206). The initial formatting may include the establishment of volume structures on the optical medium. In some embodiments, act 206 may be performed automatically upon detecting a blank optical medium inserted into optical drive 150. In other embodiments, the exemplary process of FIG. 2 may pause after determining that the optical medium is blank and may wait for a user to specifically enter a command, via host processing device 100, to cause the file system to perform act 206.

Next, the file system may write file system information to the optical medium (act 208). The file system information may be written to the volume structures on the optical medium, or to other areas of the optical medium. The file system may then issue one or more commands to optical drive 150 to perform quick grow formatting of the optical medium (act 210).

Acts 202-210 may be performed by the file system in a foreground mode. In other words, a user may not have input/output access to the optical medium while acts 202-210 are being performed. After completion of act 210, the file system may initiate and control a process for formatting (de-icing) the optical medium in a background mode (background formatting) without background formatting assistance from optical drive 150 (act 214). Details of the background formatting process are discussed below.

If, during act 204, the optical medium is determined to not be blank, then the file system may issue one or more commands to optical drive 150 to determine whether the background formatting of the optical medium is completed (act 212). The file system may accomplish act 212 by sending a query to optical drive 150 requesting a count of a number of free blocks on the optical medium. If the file system determines that the background formatting of the optical medium is not completed, then the file system may initiate and control the background formatting of optical drive 150. Otherwise, the process may be completed.

Figure 3:
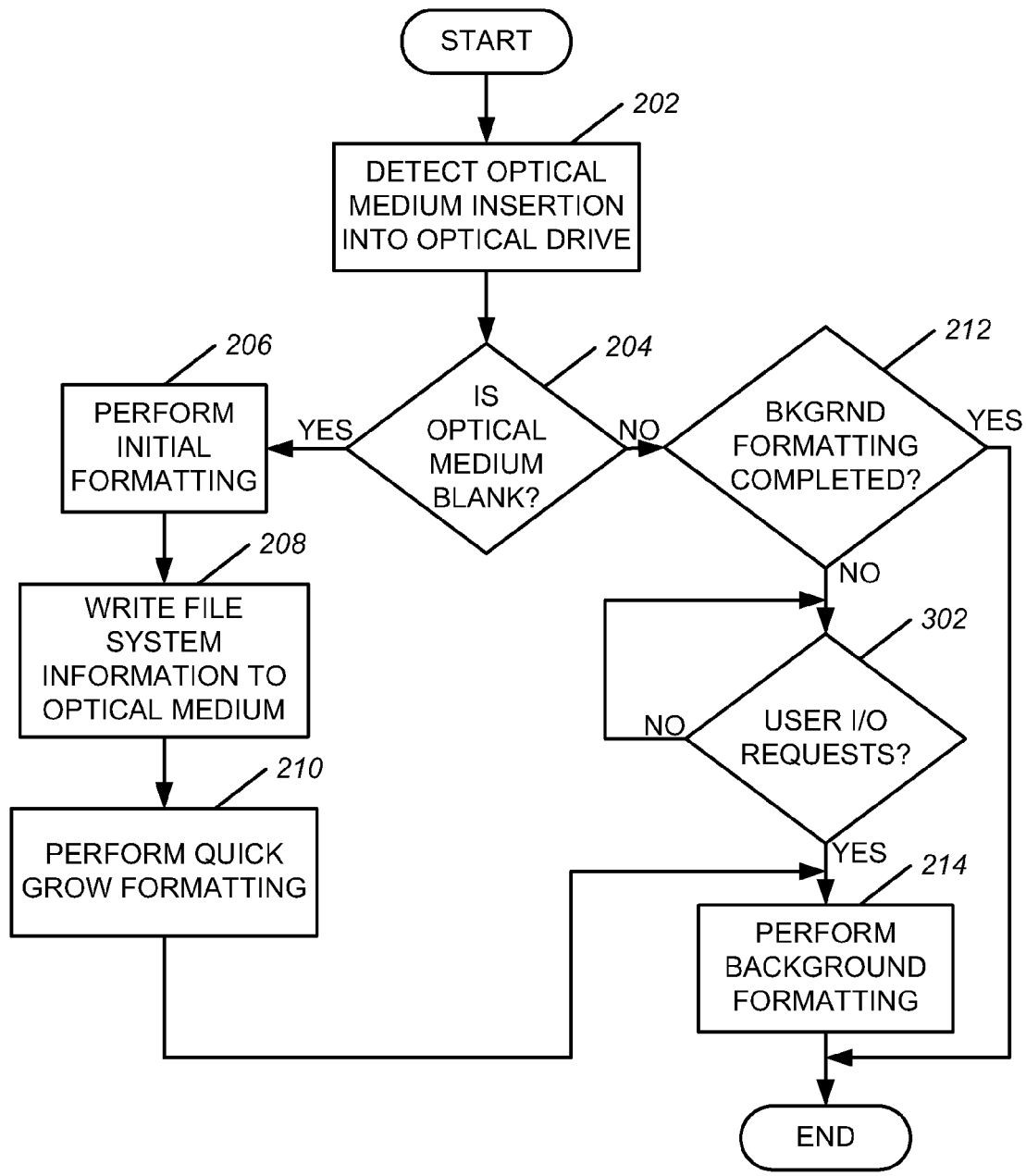
FIG. 3 is a flowchart illustrating a variation of the exemplary process of FIG. 2.

FIG. 3 illustrates the exemplary process of FIG. 2 with a slight modification. Acts 202-214 may be performed as described previously, with respect to FIG. 2. However, in the exemplary process of FIG. 3, after performing acts 202-212, the file system, executing in host processing device 100, may determine that the inserted optical medium is non-blank and not completely background formatted, or de-iced. The file system may perform act 302 to wait for a user input/output request, with respect to the optical medium, before initiating the background formatting, or de-icing. As a result, a user may not be confused by optical drive activity, which may appear to have been initiated mysteriously upon insertion of a non-blank, incompletely de-iced, optical medium.

Figure 4:
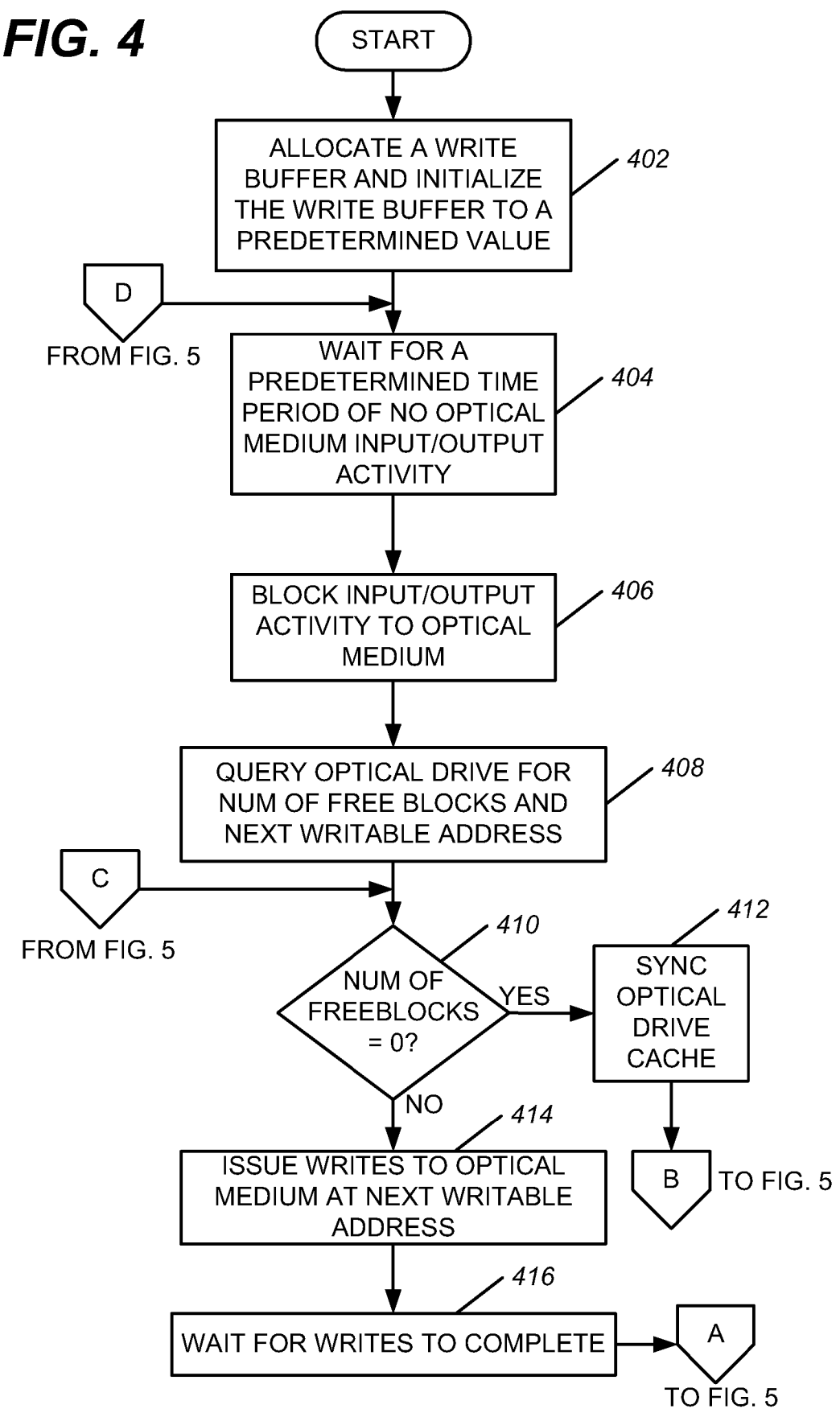
FIGS. 4 and 5 are flowcharts illustrating an exemplary process for performing background formatting or de-icing of an optical medium, initiated and controlled by a file system executing on a host processing device, with no background formatting assistance from an optical drive, upon which the optical medium is mounted.
Figure 5:
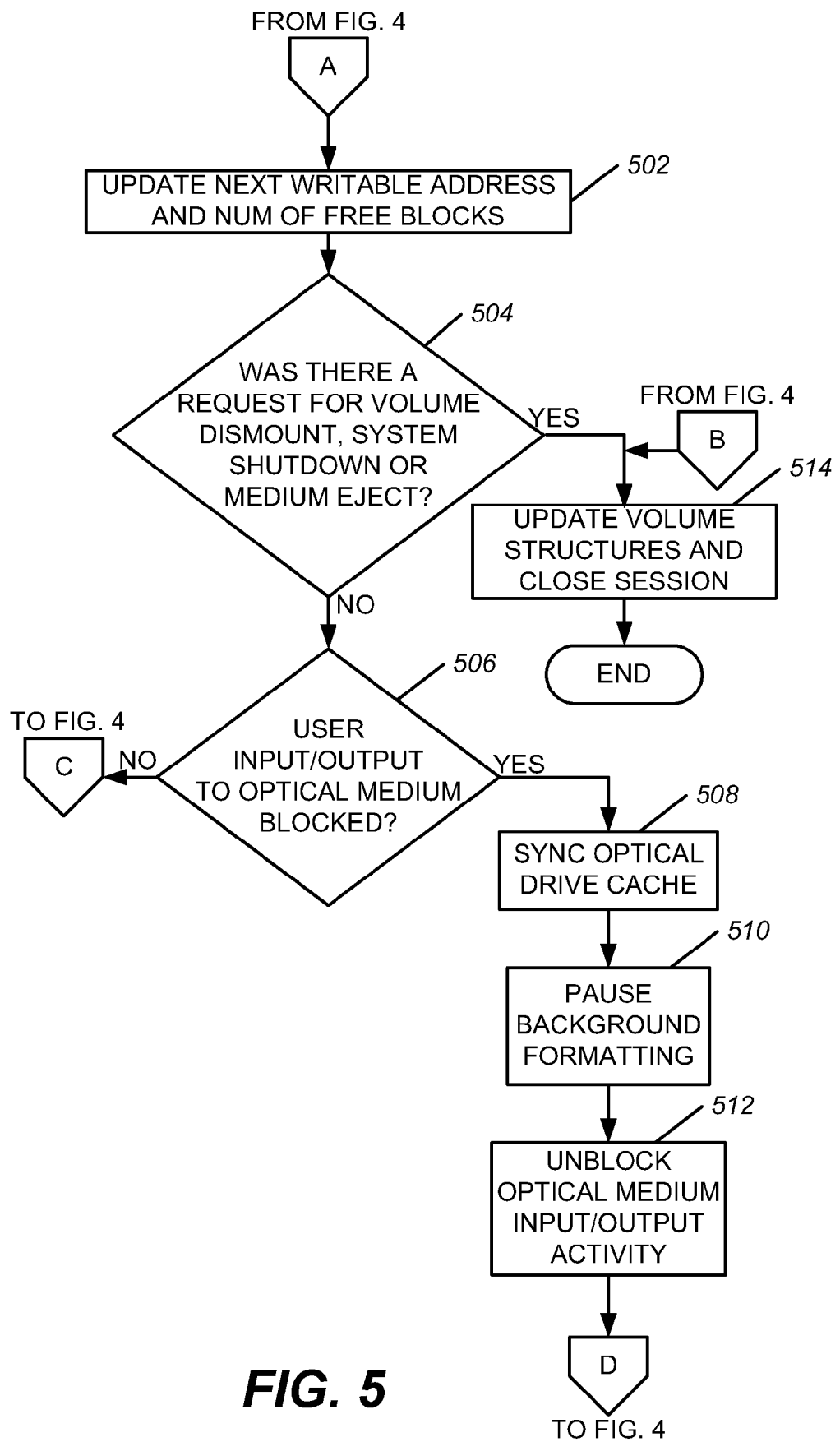

FIGS. 4 and 5 are flowcharts illustrating an exemplary process for performing background formatting of an optical medium, initiated and controlled by a file system executing on host processing device 100. The process may begin with the file system allocating a write buffer and initializing the write buffer to a predetermined value (act 402). In some embodiments the predetermined value may be zeroes. However, in other embodiments, a different predetermined value may be used.

The file system may then wait for a predetermined time period in which an optical medium mounted in an optical drive has no input or output activity (act 404). In some embodiments, the predetermined time period may be 10 seconds, 30 seconds, or another suitable value. Further, the predetermined time period may be configurable in some embodiments. If input or output activity, with respect to the optical medium, occurs at a time less than the predetermined time period, the file system may then wait for a next predetermined time period in which the optical medium has no input or output activity.

After the predetermined time period of no input or no output activity, with respect to the optical medium, the file system may block input and output activity to the optical medium (act 406). The file system that may then send a query to the optical drive requesting a count of a number of free blocks of the optical medium and a next writable address (NWA) to which the optical medium may be written (act 408). The file system may then determine whether the count of the number of free blocks of the optical medium is equal to zero (act 410).

If the number of free blocks of the optical medium is determined to not be equal to zero, then the file system may issue one or more commands to write the write buffer, beginning at the NWA of the optical medium (act 414). The file system may then wait for an indication, from optical drive 150, indicating that the write to the optical medium has completed (act 416). The file system may then update the NWA and the count of the number of free blocks, in memory 130 of host processing device 100 (act 502; FIG. 5).

The file system may then determine whether there is a request for the optical medium to be ejected, for a volume (the optical medium) to be dismounted, or for the host processing device 100 to be shutdown (act 504). If the optical medium is not to be ejected, the volume not dismounted, and host processing device 100 is not to be shutdown, then the file system may determine whether any input/output activity or operation, with respect to the optical medium, such as, for example, a user input or a user output activity or operation, is blocked (act 506). If, the user input or the user output activity or operation is not blocked, then the file system may again perform act 410 (FIG. 4).

Optical drive 150 may have an optical drive cache, such that when the file system writes to the optical medium, the writes may be stored in the optical drive cache. Eventually, the writes may be performed with respect to the optical medium. If, during act 506, the file system determines that a user input or a user output activity or operation, with respect to the optical medium, is blocked, then the file system may send one or more commands to optical drive 150 to cause optical drive 150 to synchronize the optical medium with the optical drive cache (act 508). The file system may then pause the background formatting of the optical medium (act 510) and may unblock the input/output activity or operation, with respect to the optical medium, thereby permitting the blocked input/output activity or operation to be performed (act 512). The file system may then perform act 404 (FIG. 4) again.

If, during act 504 (FIG. 5), the file system determines that the optical medium is to be ejected, the volume is to be dismounted, or the host processing device is to be shutdown, then the file system may update the volume structures on the optical medium and may place the optical medium in a closed session state, such that the optical medium may be ROM compatible (act 514). The background formatting process may then end.

If, during act 410 (FIG. 4), the file system determines that the count of the number of free blocks of the optical medium is equal to zero, indicating that the optical medium is fully background formatted, then the file system may send one or more commands to optical drive 150 to cause optical drive 150 to synchronize the optical medium with the optical drive cache (act 412). The file system may then perform act 514 to update the volume structures on the optical medium and to place the optical medium in a closed session state to make the optical medium ROM compatible (act 514).

Miscellaneous

Various embodiments discussed above may be used with DVD-RW media, HD DVD-RW media, as well as any optical media incapable of being randomly written to without having been fully formatted.

Conclusion

Although the subject matter has been described in language specific to structural features and/or methodological acts, it is to be understood that the subject matter in the appended claims is not necessarily limited to the specific features or acts described above. Rather, the specific features and acts described above are disclosed as example forms for implementing the claims.

Although the above descriptions may contain specific details, they are not to be construed as limiting the claims in any way. Other configurations of the described embodiments are part of the scope of this disclosure. Further, implementations consistent with the subject matter of this disclosure may have more or fewer acts than as described with respect to FIGS. 2-5, or may implement acts in a different order than as shown. Accordingly, the appended claims and their legal equivalents define the invention, rather than any specific examples given.

We claim as our invention:

1. A machine-implemented method for formatting an optical medium, the machine-implemented method comprising:
    background formatting the optical medium after the optical medium had been previously foreground formatted to record volume structures such that the optical medium is capable of being read or written according to a file system executing in a host processing device, the background formatting being initiated and controlled by the file system in the host processing device;
    detecting whether a user input or a user output, with respect to the optical medium, is blocked during the background formatting;
    when the user input or the user output is detected as being blocked during the background formatting, performing, under control of the file system:
        pausing the background formatting,
        unblocking any user inputs and any user outputs, and
        resuming the background formatting by the file system in the host processing device, after detecting no input/output activity with respect to the optical medium.

2. The machine-implemented method of claim 1, further comprising:
synchronizing an optical drive cache with the optical medium before the unblocking of all of the inputs and all of the outputs.

3. The machine-implemented method of claim 1, further comprising:
placing the optical medium in a closed session state to make the optical medium ROM compatible, after the background formatting is completed.

4. The machine-implemented method of claim 1, further comprising:
keeping track of a next writable address in a storage of the host processing device during the background formatting;
updating, by the file system, the volume structures on the optical medium after the background formatting is completed.

5. The machine-implemented method of claim 1, further comprising:
detecting insertion of the optical medium into an optical drive, the optical medium being blank;
foreground formatting the optical medium and recording the volume structures such that the optical medium is capable of being read or written according to the file system in the host processing device; and
performing foreground quick grow formatting of the optical medium to permit sequential writing to the optical medium before the optical medium is fully formatted.

6. The machine-implemented method of claim 1, further comprising:
detecting insertion of the optical medium into an optical drive, the optical medium being non-blank and incompletely background formatted; and
resuming the background formatting of the optical medium after a predetermined time period of no input/out activity, with respect to the optical medium.

7. The machine-implemented method of claim 6, wherein the resuming of the background formatting occurs only after a user write to the optical medium is performed.

8. A host processing device having an optical drive, the host processing device comprising:
at least one processor;
a memory connected to the at least one processor;
a file system, included in a storage device, having instructions for the at least one processor to read from and write to an optical medium mounted in the optical drive, the file system further comprising:
instructions for determining whether the optical medium is not fully background formatted;
instructions for initiating and controlling a process for background formatting the optical medium when the optical medium has been determined to have no background formatting; and
instructions for pausing the background formatting of the optical medium to permit a user read or a user write with respect to the optical medium.

9. The host processing device of claim 8, wherein the process for performing the background formatting of the optical medium performs the background formatting without any background formatting support from the optical drive.

10. The host processing device of claim 8, wherein the file system further comprises instructions for resuming the background formatting of the optical medium when the optical medium is determined to be partially background formatted.

11. The host processing device of claim 10, wherein the file system further comprises instructions for waiting for at least one user input/output operation, with respect to the optical medium, before resuming the background formatting.

12. The host processing device of claim 8, wherein the file system further comprises instructions for resuming the background formatting of the optical medium only after no input/output operation occurs, with respect to the optical medium, for at least a predetermined time period.

13. The host processing device of claim 8, wherein the file system further comprises:
instructions for immediately terminating the background formatting of the optical medium and making the optical medium ROM compatible after a user attempts to eject the optical medium.

14. The host processing device of claim 8, wherein the file system further comprises instructions for synchronizing an optical drive cache, before permitting the user read or the user write, before the background formatting of the optical medium is completed.

15. A tangible machine-readable storage device having recorded thereon a file system including instructions for at least one processor of a host processing device, the instructions comprising:
instructions for blocking user input/output operations, with respect to an optical medium mounted in an optical drive;
instructions for querying a number of free blocks of the optical medium and a next writable address;
instructions for background formatting the optical medium starting from the next writable address;
instructions for determining whether a user read or a user write is blocked during the background formatting; and
instructions for synchronizing the optical medium with an optical drive cache, pausing the background formatting, and unblocking the user input/output operations, with respect to the optical medium, when the user read or the user write is determined to be blocked.

16. The tangible machine-readable storage device of claim 15, wherein the file system further comprises instructions for resuming the background formatting after a predetermined time period of no input/output activity, with respect to the optical medium.

17. The tangible machine-readable storage device of claim 15, wherein the file system further comprises instructions for placing the optical medium in a closed session state, after completion of the background formatting.

18. The tangible machine-readable storage device of claim 15, wherein the instructions for background formatting the optical medium perform the background formatting with no background formatting assistance from the optical drive.

19. The tangible machine-readable storage device of claim 15, wherein the file system further comprises:
instructions for determining whether a newly mounted optical medium is partially background formatted, and
instructions for resuming the background formatting after a predetermined time period of no input/output activity, with respect to the optical medium.

20. The tangible machine-readable storage device of claim 19, wherein the instructions for resuming the background formatting after a predetermined time period of no input/output activity, with respect to the optical medium, are executed only after a user write to the newly mounted optical medium occurs.

* * * * *